US012381592B2

(12) United States Patent
Jang et al.

(10) Patent No.: US 12,381,592 B2
(45) Date of Patent: Aug. 5, 2025

(54) WIRELESS COMMUNICATION DEVICE INCLUDING RADIO FREQUENCY INTEGRATED CIRCUIT AND METHOD OF CONTROLLING THE SAME

(71) Applicant: SAMSUNG ELECTRONICS CO., LTD., Suwon-si (KR)

(72) Inventors: Kyujae Jang, Suwon-si (KR); Hyeyong Go, Suwon-si (KR); Jimin Koo, Suwon-si (KR); Minchull Paik, Suwon-si (KR); Sanghyeok Yang, Suwon-si (KR); Yeongseob Lim, Suwon-si (KR); Sungyoul Cho, Suwon-si (KR); Dohun Kim, Suwon-si (KR); Jaeuk Ryu, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 336 days.

(21) Appl. No.: 17/861,733

(22) Filed: Jul. 11, 2022

(65) Prior Publication Data
US 2023/0007836 A1    Jan. 12, 2023

Related U.S. Application Data

(63) Continuation of application No. PCT/KR2022/008526, filed on Jun. 16, 2022.

(30) Foreign Application Priority Data

Jul. 7, 2021  (KR) .................. 10-2021-0089072

(51) Int. Cl.
*H04B 1/40*   (2015.01)
(52) U.S. Cl.
CPC ..................... *H04B 1/40* (2013.01)

(58) Field of Classification Search
CPC ........................ H04B 7/0693; H04B 7/0877
See application file for complete search history.

(56) References Cited

U.S. PATENT DOCUMENTS

| 9,363,845 | B1 | 6/2016 | Sahoo et al. |
| 9,602,464 | B2 | 3/2017 | Hein et al. |

(Continued)

FOREIGN PATENT DOCUMENTS

| KR | 101905249 B1 | 10/2018 |
| KR | 1020200043615 A | 4/2020 |

(Continued)

OTHER PUBLICATIONS

International Search Report and Written Opinion for International Application No. PCT/KR2022/008526; International Filing Date Jun. 16, 2022; Date of Mailing Sep. 8, 2022; 47 Pages.

*Primary Examiner* — Wen W Huang
(74) *Attorney, Agent, or Firm* — CANTOR COLBURN LLP

(57) ABSTRACT

A wireless communication device may include a processor, a first RF integrated circuit including a first control port for controlling a first RF processing circuit and a RF front end circuit and configured to communicate with the processor, a second RF integrated circuit including a second control port for controlling a second RF processing circuit and the RF front end circuit and configured to communicate with the processor, and the RF front end circuit controlled through the first control port and the second control port and configured to communicate with the first RF integrated circuit to exchange a first RF signal, wherein the processor is configured to determine whether to process a second RF signal in the second RF processing circuit and deactivate at least one component for processing the second RF signal in the second RF processing circuit based on the determining.

19 Claims, 6 Drawing Sheets

(56) References Cited

U.S. PATENT DOCUMENTS

| | | | |
|---|---|---|---|
| 10,187,137 B2 | 1/2019 | Weissman et al. | |
| 10,554,244 B2 | 2/2020 | Bai | |
| 2008/0051046 A1* | 2/2008 | Ruckriem | H04B 7/082 455/272 |
| 2010/0061284 A1* | 3/2010 | Chen | H04W 52/10 370/311 |
| 2013/0316660 A1* | 11/2013 | Hsin | H04W 74/0808 455/226.1 |
| 2014/0098694 A1* | 4/2014 | Damji | H04W 52/0229 370/252 |
| 2015/0280804 A1* | 10/2015 | Melzer | H04B 7/0854 375/316 |
| 2015/0381221 A1* | 12/2015 | Cyzs | H04B 1/7097 375/346 |
| 2016/0127016 A1* | 5/2016 | Pehlke | H04B 7/0877 370/329 |
| 2016/0306034 A1 | 10/2016 | Trotta et al. | |
| 2017/0222694 A1* | 8/2017 | Tota | H04B 7/0413 |
| 2019/0115946 A1* | 4/2019 | Pehlke | H04W 72/0453 |
| 2021/0058124 A1 | 2/2021 | Pehlke | |
| 2021/0288401 A1* | 9/2021 | Lee | H01Q 1/243 |

FOREIGN PATENT DOCUMENTS

| | | | |
|---|---|---|---|
| KR | 20200117575 A | 10/2020 | |
| KR | 1020190046184 A | 10/2020 | |
| KR | 1020210058077 A | 5/2021 | |
| WO | 2016109949 A1 | 7/2016 | |

* cited by examiner

WIRELESS COMMUNICATION DEVICE INCLUDING RADIO FREQUENCY INTEGRATED CIRCUIT AND METHOD OF CONTROLLING THE SAME

CROSS-REFERENCE TO RELATED APPLICATIONS

This application is a national stage application of International Application No. PCT/KR2022/008526 designating the United States, filed on Jun. 16, 2022, at the Korean Intellectual Property Receiving Office and claims priority to Korean Patent Application No. 10-2021-0089072, filed on Jul. 7, 2021, at the Korean Intellectual Property Office, the disclosures of which are incorporated by reference herein in their entireties.

BACKGROUND

1. Field

The following disclosure relates to a wireless communication device including a radio frequency (RF) integrated circuit and a method of controlling the same.

2. Description of Related Art

With the development of mobile communication technology, the use of wireless communication devices having antennas has spread widely. A wireless communication device may transmit and/or receive a radio frequency (hereinafter, "RF") signal through antennas. The wireless communication device may transmit the RF signal to a wireless communication network by modulating data and carrying the data on a carrier wave. In addition, the wireless communication device may receive the RF signal from the wireless communication network and amplify and demodulate the RF signal. For example, the wireless communication device may perform communication using a high frequency wave (e.g., a fifth generation (5G) millimeter wave (mm-Wave)). The wireless communication device may include an antenna and an RF integrated circuit for processing transmitted and/or received RF signals to reduce a transmission loss that increases on a transmission line.

The wireless communication device may include an RF front end module between the RF integrated circuit and the antenna to support multi-mode, multi-band communication. The RF front end module may be controlled by general RF control (GRFC) or mobile industry processor interface (MIPI).

SUMMARY

According to an example embodiment, a wireless communication device may include a processor, a first RF integrated circuit including a first control port for controlling a first RF processing circuit and an RF front end circuit and configured to communicate with the processor, a second RF integrated circuit including a second control port for controlling a second RF processing circuit and the RF front end circuit and configured to communicate with the processor, and the RF front end circuit controlled through the first control port and the second control port and configured to communicate with the first RF integrated circuit to exchange a first RF signal, wherein the processor is configured to determine whether to process a second RF signal in the second RF processing circuit and deactivate a component for processing the second RF signal in the second RF processing circuit based on the determining.

According to an example embodiment, a method of controlling a wireless communication device may include receiving setting information of a first RF integrated circuit including a first RF processing circuit and a first control port, a second RF integrated circuit including a second RF processing circuit and a second control port, and an RF front end circuit exchanging a first RF signal with a first RF integrated circuit from a network, setting the first RF integrated circuit, the second RF integrated circuit, and the RF front end circuit based on the setting information, and controlling the RF front end circuit through the first control port and the second control port, wherein the setting may include determining whether to process a second RF signal in the second RF processing circuit based on the setting information, and deactivating a component for processing the second RF signal in the second RF processing circuit based on the determining.

According to an example embodiment, an RF processing circuit to process an RF signal may include a primary receiver to receive the RF signal from an RF front end circuit through a primary reception path, a diversity receiver to receive the RF signal from the RF front end circuit through a diversity reception path, a first transmission chain transmitting the RF signal to the RF front end circuit, a second transmission chain transmitting the RF signal to the RF front end circuit, and a core processor to control the primary receiver, the diversity receiver, the first transmission chain, and the second transmission chain. The RF processing circuit further includes a control port to control an RF front end circuit. The RF processing circuit further includes a processor interface to communicate with a processor, wherein the processor determines whether to process the RF signal in the RF processing circuit and deactivates at least one component for processing the RF signal in the RF processing circuit based on the determining.

According to an example embodiment, a wireless communication device may reduce power consumption by deactivating unnecessary components in controlling an RF front end circuit using a plurality of RF integrated circuits.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
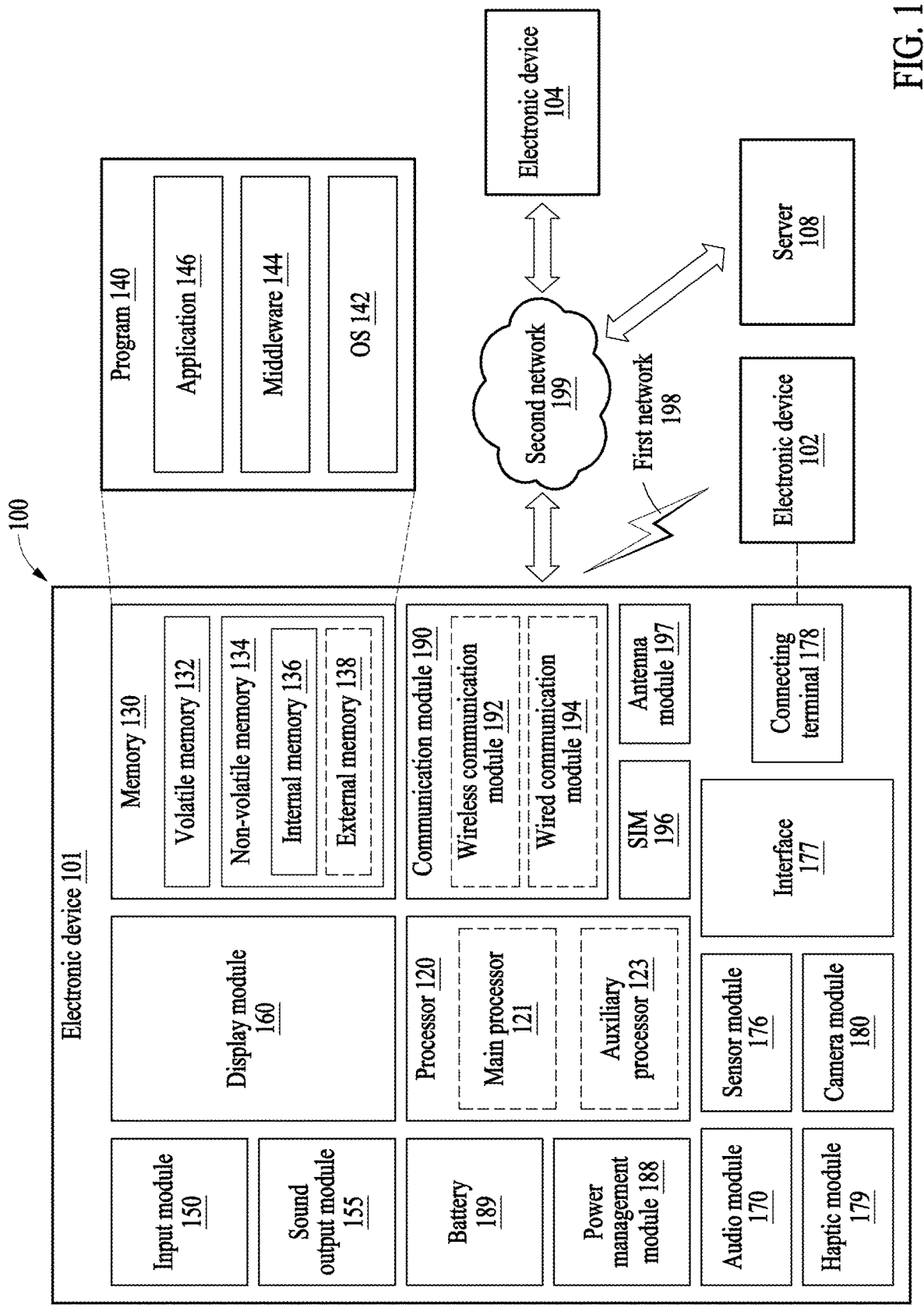
FIG. 1 is a block diagram illustrating an electronic device in a network environment according to various example embodiments.

One or more embodiments of the invention now will be described more fully hereinafter with reference to the accompanying drawings, in which various embodiments are shown. One or more embodiments may, however, be embodied in many different forms, and should not be construed as limited to the embodiments set forth herein. Rather, these embodiments are provided so that this disclosure will be thorough and complete, and will fully convey the scope of embodiments of the invention to those skilled in the art.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, example embodiments will be described in detail with reference to the accompanying drawings. When describing the example embodiments with reference to the accompanying drawings, like reference numerals refer to like elements and any repeated description related thereto will be omitted.

As wireless communication devices support more frequency bands for long-term evolution (LTE) and new radio (NR) technologies, radio frequency (RF) front end circuit components, such as a switch and an amplifier for each frequency band, and switch components for securing a reference signal (RS) or an alternative RF path to improve performance of the NR technologies may be included in the RF front end circuit.

The RF front end circuit may be connected to another RF front end circuit and controlled by a control signal of an RF integrated circuit. The RF front end circuit may be controlled by a control signal of mobile industry processor interface (MIPI) or general RF control (GRFC). The RF front end circuit may be connected to an RF front end MIPI bus line or a GRFC port as a control port of the RF integrated circuit and controlled by receiving a control signal of the corresponding bus line or port.

Therefore, more bus lines or ports may be needed as more components need to be controlled in the RF front end circuit. A number of bus lines and/or a number of ports that may be provided in one RF integrated circuit may be limited, and the number of bus lines or the number of ports provided by one RF integrated circuit may not be sufficient to control all components of the RF front end circuit.

According to an example embodiment, a wireless communication device may control an RF front end circuit using a plurality of RF integrated circuits.

FIG. 1 is a block diagram illustrating an electronic device 101 in a network environment 100 according to various example embodiments. Referring to FIG. 1, the electronic device 101 in the network environment 100 may communicate with an electronic device 102 via a first network 198 (e.g., a short-range wireless communication network), and/or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, and/or an antenna module 197. In some example embodiments, at least one of the components (e.g., the connecting terminal 178) may be omitted from the electronic device 101, and/or one or more other components may be added in the electronic device 101. In some example embodiments, some of the components (e.g., the sensor module 176, the camera module 180, and/or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to detect a touch, or a pressure sensor adapted to measure the intensity of force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., the electronic device 102 such as a speaker or a headphone) directly (e.g., wired) or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., substantially 20 Gbps or more) for implementing eMBB, loss coverage (e.g., substantially 164 dB or less) for implementing mMTC, or U-plane latency (e.g., substantially 0.5 ms or less for each of downlink (DL) and uplink (UL), or a round trip of substantially 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the electronic device 104 via the server 108 coupled with the second network 199. Each of the electronic devices 102 or 104 may be a device of the same type as or a different type from the electronic device 101. According to an example embodiment, all or some of operations to be executed by the electronic device 101 may be executed at one or more external electronic devices (e.g., the electronic devices 102 and 104, and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the electronic device 104 may include an Internet-of-things (IoT) device. The server 108 may be an intelligent server using machine learning and/or a neural network. According to an example embodiment, the electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
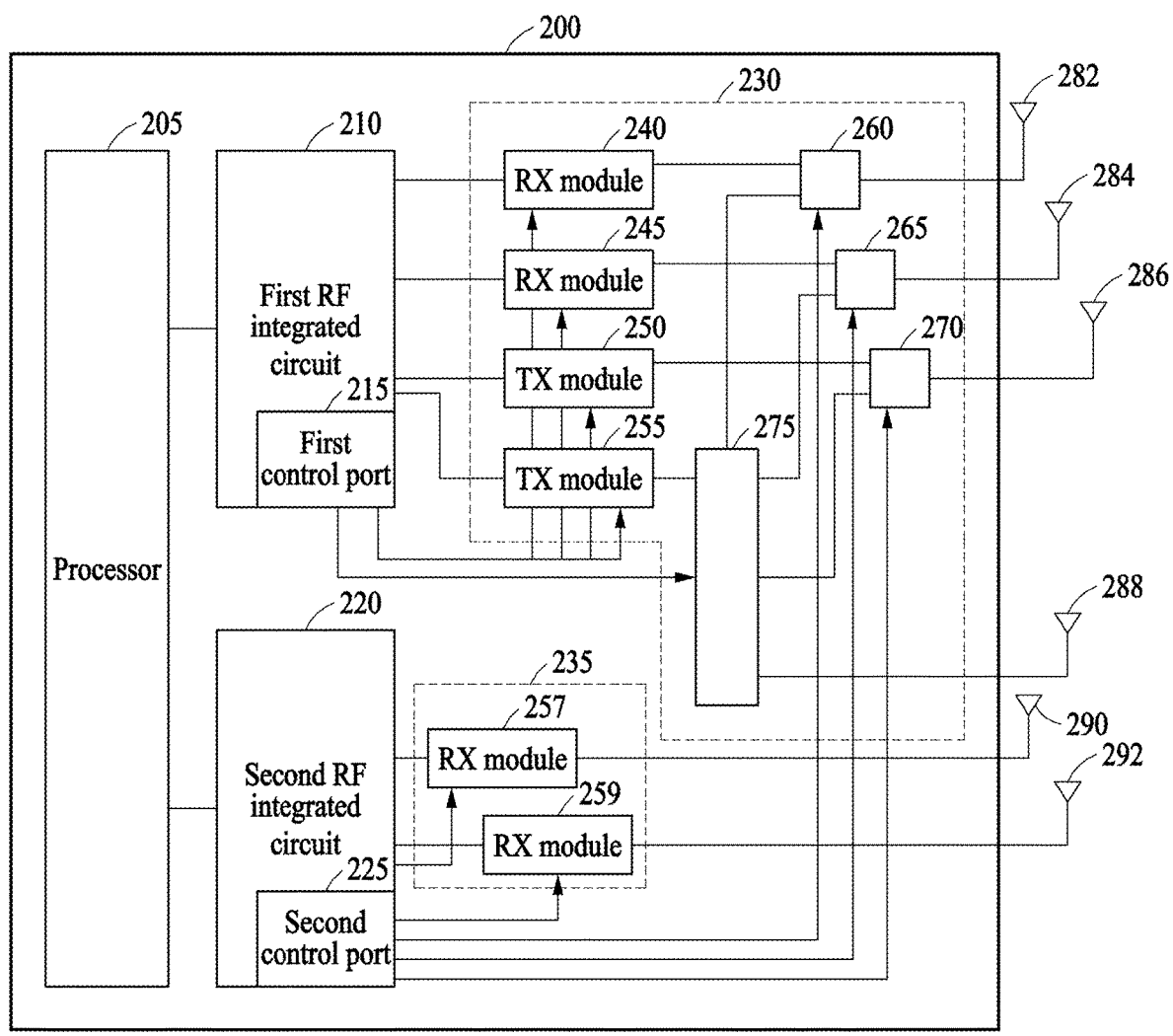
FIG. 2 is a block diagram illustrating a configuration of a wireless communication device including a radio frequency (RF) integrated circuit according to an example embodiment.

FIG. 2 is a block diagram illustrating a configuration of a wireless communication device 200 including an RF integrated circuit according to an example embodiment.

According to an example embodiment, the wireless communication device 200 (e.g., the communication module 190) may include a first RF integrated circuit 210 and a second RF integrated circuit 220. The wireless communication device 200 may control a portion of components of an RF front end circuit through a first control port 215 of the first RF integrated circuit 210 by connecting the first RF integrated circuit 210 and the RF front end circuit, and control another portion of the components of the RF front end circuit that may not be controlled by the first RF integrated circuit 210 through a second control port 225 of the second RF integrated circuit 220 due to the first RF integrated circuit 210 having a limited number of control ports by connecting the another portion of the components to the second RF integrated circuit 220.

Referring to FIG. 2, the wireless communication device 200 including an RF integrated circuit may include a processor 205 communicating with the first RF integrated circuit 210, the second RF integrated circuit 220, and a first RF front end circuit 230. The wireless communication device 200 may further include a second RF front end circuit 235. The second RF front end circuit 235 may not be included in the wireless communication device 200 according to one or more embodiments described herein.

The first RF integrated circuit 210 may include a first control port 215 for controlling a first RF processing circuit for processing a first RF signal and the first RF front end circuit 230 and communicate with the processor 205. The second RF integrated circuit 220 may include a second control port 225 for controlling a second RF processing circuit for processing a second RF signal and the first RF front end circuit 230 and communicate with the processor 205. When the wireless communication device 200 includes the second RF front end circuit 235, the second control port 225 may be used to control the second RF front end circuit 235.

When receiving a first RF signal, the first RF integrated circuit 210 may convert a first analog RF signal transmitted through an antenna and the first RF front end circuit 230 to a digital signal to transmit the digital signal to the processor 205. When transmitting the first RF signal, the first RF integrated circuit 210 may convert the digital signal transmitted from the processor 205 to the first analog RF signal to transmit the first analog RF signal to the first RF front end circuit 230.

The first RF front end circuit 230 may be controlled by the first RF integrated circuit 210 and the second RF integrated circuit 220 through the first control port 215 and the second control port 225. The first RF front end circuit 230 may communicate with the first RF integrated circuit 210 to exchange the first RF signal. As an example, when receiving the first RF signal from an antenna 282 and 284, the first RF front end circuit 230 may remove or amplify a noise of the received first RF signal to transmit the first RF signal to the first RF integrated circuit 210. As an example, when transmitting the first RF signal using an antenna 282, 284, 286, and 288, the first RF front end circuit 230 may receive the first RF signal to be transmitted from the first RF integrated circuit 210 and amplify and transmit the received first RF signal to one or more of the antenna 282, 284, 286, and 288.

The first RF front end circuit 230 may include multiple components. For example, as illustrated in FIG. 2, the first RF front end circuit 230 may include an Rx module 240 and an Rx module 245. The Rx modules 240, 245 are provided for receiving the first RF signal through an antenna (e.g., one or more of the antenna 282, 284, 286, 288). The first RF front end circuit 230 may further include a Tx module 250 and a Tx module 255. The Tx modules 250, 255 are provided for transmitting the first RF signal through the antenna (e.g., one or more of the antenna 282, 284, 286, 288). The first RF front end circuit 230 may further include a switch 260, a switch 265, a switch 270, and a switch 275. The switches 260, 265, 270, 275 are provided for adjusting a first RF signal path. The first RF signal path through which the first RF signal is transmitted may be formed by one or more of the switches 260, 265, 270, and 275 included in the first RF front end circuit 230. According to one or more embodiments described herein, the Rx modules 240 and 245 may include a low-noise amplifier (LNA). According to one or more embodiments described herein the Tx modules 250 and 255 may include a Low noise Power Amplifier Module with Integrated Duplexer (LPAMID), a Power Amplifier Module with Integrated Duplexer (PAMID), a Front-End Module with Integrated Duplexer (FEMID), and the like.

One or more of the switches 260, 265, and 270 may be a Single Pole Double Throw (SPDT) switch. The switch 275 may be a Single Pole 4 Throw (SP4T) switch. However, the examples are not limited thereto, and various switches, such as a Single Pole Single Throw (SPST) switch, an SP4T switch, and a Single Pole 6 Throw (SP6T) switch, may be included according to a configuration of the first RF front end circuit 230.

A portion of the first RF front end circuit 230 may be controlled by a control signal of the first control port 215, and another portion of the first RF front end circuit 230 may be controlled by the second control port 225. The wireless communication device 200 may control one or more of the components in the first RF front end circuit 230 using the first control port 215, but a number of ports provided by the first RF integrated circuit 210 may be limited and may not be sufficient to control all components of the first RF front end circuit 230. For example, as illustrated in FIG. 2, when a number of components that may be controlled through the first control port 215 is five (e.g., Rx module 240, Rx module 245, Tx module 250, Tx module 255, and switch 275), and the number of components that need to be controlled in the first RF front end circuit 230 is eight (e.g., Rx module 240, Rx module 245, Tx module 250, Tx module 255, switch 275, switch 260, switch 265, and switch 270), the remaining three components (e.g., switch 260, switch 265, and switch 270) may not be controlled by the first RF integrated circuit 210.

The wireless communication device 200 may connect the second control port 225 of the second RF integrated circuit 220 to components of the first RF front end circuit 230 that are not connected to the first control port 215 so that the second RF integrated circuit 220 may control the components. For example, when the number of components that may be controlled through the first control port 215 is five (e.g., Rx module 240, Rx module 245, Tx module 250, Tx module 255, and switch 275), and the number of components that need to be controlled in the first RF front end circuit 230 is eight (e.g., Rx module 240, Rx module 245, Tx module 250, Tx module 255, switch 275, switch 260, switch 265, and switch 270), the three components (e.g., switch 260, switch 265, and switch 270) that are not connected to the first control port 215 may be connected to and controlled by the second control port 225.

However, the example of FIG. 2 is merely an example, and the configuration of the first RF front end circuit 230 and a connection relationship between the first RF front end circuit 230 and the first control port 215 and the second control port 225 may be formed in various ways.

In an example embodiment, the wireless communication device 200 may include the second RF front end circuit 235 that communicates with the second RF integrated circuit 220 to exchange a second RF signal. The second RF front end circuit 235 may be connected to the second control port 225 to be controlled by the second RF integrated circuit 220. The second RF front end circuit 235 may transmit the second RF signal received from one or more of an antenna 290 and an antenna 292 to the second RF integrated circuit 220 or transmit the second RF signal transmitted from the second RF integrated circuit 220 to the antenna 290, 292. As illustrated in FIG. 2, the second RF front end circuit 235 includes Rx module 257 and Rx module 259, but this is merely an example, and the second RF front end circuit 235 may include an Rx module, a Tx module, and/or a switch like the first RF front end circuit 230. The second RF integrated circuit 220 may convert a second analog RF signal received from the second RF front end circuit 235 to a digital signal to transmit the digital signal to the processor 205, or receive the digital signal from the processor 205 and convert the digital signal to the second analog RF signal to transmit the second analog RF signal to the second RF front end circuit 235.

In another example embodiment, the second RF front end circuit 235 may not be included in the wireless communication device 200.

According to one or more embodiments described herein, in the wireless communication device 200, the first RF signal transmitted through the first RF front end circuit 230 is transmitted or received only through the first RF integrated circuit 210, and thus, when transmitting the first RF signal through the first RF front end circuit 230, the second RF integrated circuit 220 may not be involved in processing the first RF signal. According to one or more embodiments described herein, when the second RF integrated circuit 220 is activated for controlling the first RF front end circuit 230, not only the second control port 225 for controlling the first RF front end circuit 230 but also a circuit of the second RF integrated circuit 220 for processing the second RF signal is activated, and accordingly, unnecessary power consumption may occur.

To prevent unnecessary power consumption, the wireless communication device 200 may deactivate at least one component for processing the second RF signal in the second RF processing circuit when there is no need to process the second RF signal in the second RF integrated circuit 220 according to one or more embodiments described herein.

In an example embodiment, the wireless communication device 200 may receive setting information of the first RF integrated circuit 210, the second RF integrated circuit 220, and/or the first RF front end circuit 230 from a network using one or more of the antenna 282 and 284. The setting information may further include setting information on the second RF front end circuit 235.

The setting information may be radio resource control (RRC) configuration information. The wireless communication device 200 may use multiple frequency bands all together for wireless communication to increase a data rate, and the setting information may include communication frequency band, carrier aggregation (CA), or Eutra new radio (NR) dual connectivity (EN-DC) combination information.

The processor 205 may determine whether to activate the second RF integrated circuit 220 based on the received setting information. The processor 205 may identify the communication frequency band, and CA or EN-DC combination information from the received setting information and decide to activate the second RF integrated circuit 220 when a number of frequency bands used for wireless communication exceeds a threshold value in the identified information.

For example, CA information may include information on a primary component carrier (PCC) and a secondary component carrier (SCC) as aggregated carriers. As an example, the processor 205 may decide to activate the second RF integrated circuit 220 in response to identifying that a number of SCCs in the CA information exceeds the threshold value. As another example, the processor 205 may decide to deactivate the second RF integrated circuit 220 in response to identifying that the number of SCCs in the CA information does not exceed the threshold value. For example, when the threshold value is five and six component carriers (CCs) as SCCs are included in the CA information, the processor 205 may decide to activate the second RF integrated circuit 220.

Similarly, EN-DC information may include information on a long-term evolution (LTE) (fourth generation (4G)) frequency band and a fifth generation (5G) frequency band used for wireless communication. As an example, the processor 205 may decide to activate the second RF integrated circuit 220 in response to identifying that a sum of a number of LTE frequency bands and a number of 5G frequency bands in the EN-DC information exceeds the threshold value. As another example, the processor 205 may decide to deactivate the second RF integrated circuit 220 in response to identifying that the sum of the number of LTE frequency bands and the number of 5G frequency bands does not exceed the threshold value. However, this is merely an example, and the processor 205 may determine whether to activate the second RF integrated circuit 220 in various ways based on the RRC configuration information.

According to one or more embodiments described herein, in response to it being determined that the second RF integrated circuit 220 is to be deactivated, the processor 205 may deactivate the second RF integrated circuit 220 and activate the first RF processing circuit and the first control port 215. The first RF front end circuit 230 may be controlled by the first RF integrated circuit 210 through the first control port 215.

According to one or more embodiments described herein, in response to it being determined that the second RF integrated circuit 220 is to be activated, the processor 205 may determine whether to process the second RF signal in the second RF processing circuit based on the setting information.

For example, the processor 205 may determine whether a second RF signal path should be set in the second RF integrated circuit 220 for transmitting and receiving the second RF signal through the antenna 290 and 292 based on the RRC information. When it is determined that the second RF signal path is to be set, the processor 205 may decide to process the second RF signal in the second RF processing circuit.

According to one or more embodiments described herein, in response to it being determined that the second RF signal is to be processed by the second RF processing circuit, the processor 205 may activate the first RF processing circuit, the first control port 215, the second RF processing circuit, and the second control port 225. In such a case, the first RF signal path may be formed through the first RF integrated circuit 210 and the first RF front end circuit 230, and the second RF signal path may be formed through the second RF integrated circuit 220 and the second RF front end circuit 235. The first RF front end circuit 230 may be controlled by a first integrated circuit and a second integrated circuit through the first control port 215 and the second control port 225. The second RF front end circuit 235 may be controlled by the second integrated circuit through the second control port 225.

According to one or more embodiments described herein, in response to it being determined that the second RF signal is not to be processed by the second RF processing circuit, the processor 205 may deactivate at least one component for processing the second RF signal in the second RF processing circuit. For example, the second RF processing circuit may include a primary receiver (PRx) receiving the second RF signal through a primary reception path and a diversity receiver (DRx) receiving the second RF signal through a diversity reception path, and the processor 205 may deactivate the primary receiver and the diversity receiver in the second RF processing circuit when it is determined that the second RF signal is not to be processed by the second RF processing circuit.

The wireless communication device 200 may prevent unnecessary power consumption by deactivating at least one component in the second integrated circuit when there is no need to process the second RF signal in the second RF integrated circuit 220.

The wireless communication device 200 may control the first RF front end circuit 230 set through the first control port 215 and the second control port 225 using the set first RF integrated circuit 210 and the set second RF integrated circuit 220. The wireless communication device 200 may control the first RF front end circuit 230 to generate an RF signal path and perform wireless communication through one or more of the antenna 282, 284, 286, and 288.

The wireless communication device 200 may receive the setting information (e.g., the RRC configuration information) of the first RF integrated circuit 210, the second RF integrated circuit 220, and/or the first RF front end circuit 230 again from the network through one or more of the antenna 282 and 284. The setting information may further include setting information on the second RF front end circuit 235.

In response to the setting information being received again, the wireless communication device 200 may determine whether the communication frequency band, CA, or EN-DC combination information is the same as existing information. In response to the setting information received again being the same as the existing information, the wireless communication device 200 may maintain a current state without taking any action. In response to the setting information received again being different from the existing information, the wireless communication device 200 may determine again whether to activate the second RF integrated circuit 220 and to process the second RF signal in the second RF processing circuit and may activate or deactivate the second RF integrated circuit 220 or deactivate at least one component for processing the second RF signal in the second RF processing circuit based on a result of the determining.

Figure 3:
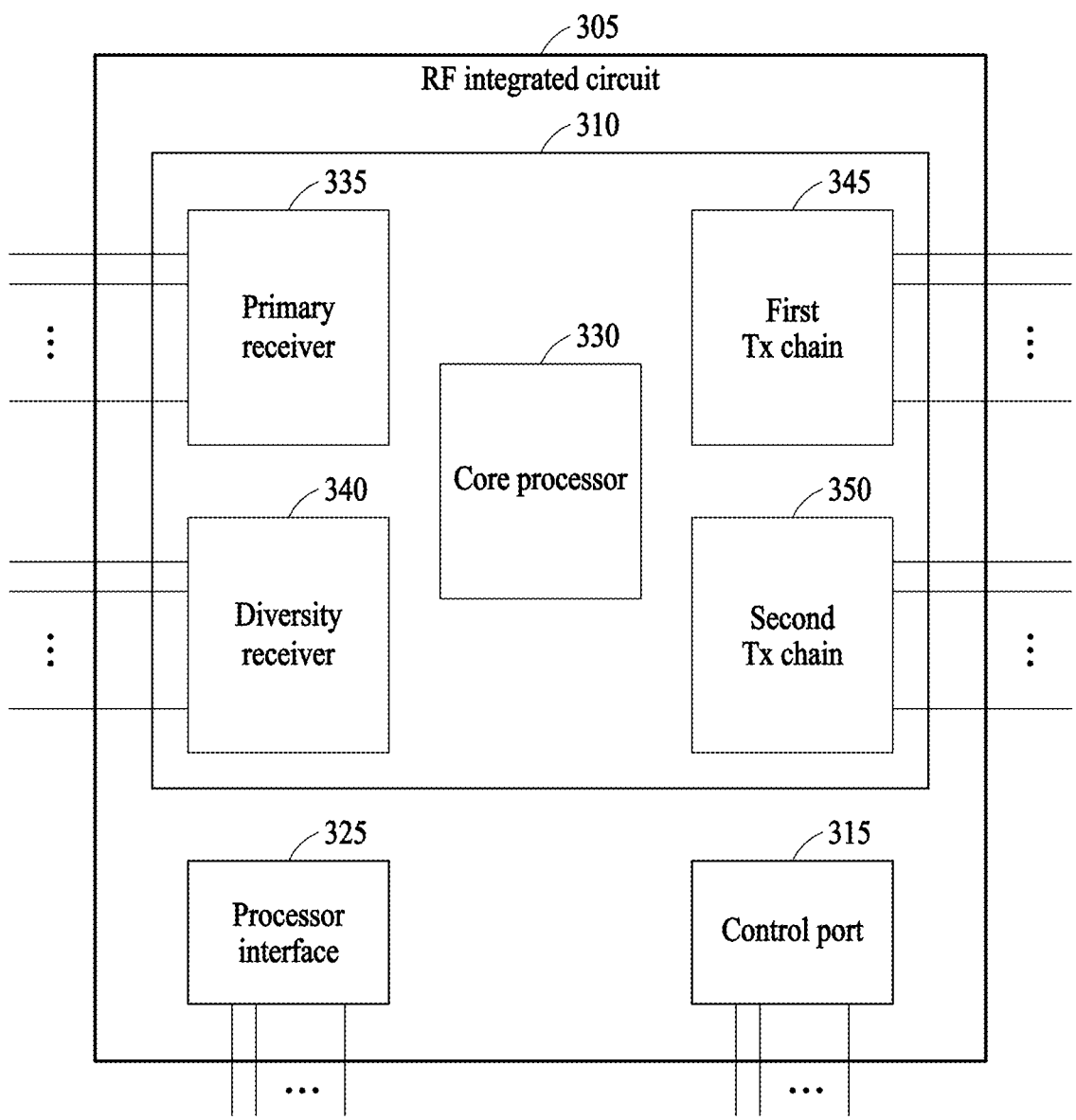
FIG. 3 is a block diagram illustrating an RF integrated circuit included in a wireless communication device according to an example embodiment.

FIG. 3 is a block diagram illustrating an RF integrated circuit included in the wireless communication device 200 according to an example embodiment.

Referring to FIG. 3, an RF integrated circuit 305 may include an RF processing circuit 310, a processor interface 325, and a control port 315. The RF integrated circuit 305 may correspond to the first RF integrated circuit 210 and/or the second RF integrated circuit 220 of FIG. 2. The control port 315 may correspond to the first control port 215 and/or the second control port 225 of FIG. 2.

The RF processing circuit 310 may include a configuration for processing an RF signal. The RF processing circuit 310 may include at least one receiver and one transmitter. For example, the RF processing circuit 310 may include a primary receiver PRx 335 receiving the RF signal from an RF front end circuit (e.g., the first RF front end circuit 230) through a primary reception path and a diversity receiver DRx 340 receiving the RF signal from the RF front end circuit through a diversity reception path. The RF processing circuit 310 may include at least one Tx chain (e.g., a first Tx chain 345 and a second Tx chain 350) transmitting the RF signal to the RF front end circuit. The RF processing circuit 310 may include a core processor 330 for controlling each component of the RF integrated circuit.

As illustrated in FIG. 2, a first RF processing circuit (e.g., the RF processing circuit 310) of the first RF integrated circuit 210 may include a PRx receiving the first RF signal from the first RF front end circuit 230 through the primary reception path and a DRx receiving the first RF signal from the first RF front end circuit 230 through the diversity reception path. The PRx of the first RF processing circuit may be connected to the Rx module 240, and the DRx of the first RF processing circuit may be connected to the Rx module 245.

As illustrated in FIG. 2, the first RF processing circuit of the first RF integrated circuit 210 may include two Tx chains, and the two Tx chains may be respectively connected to the Tx module 250 and the Tx module 255. However, a configuration of the first RF processing circuit is not limited thereto, and the first RF processing circuit may be configured in various ways together with the first RF front end circuit 230. For example, when an Rx module and a Tx module are added to the first RF front end circuit 230, the first RF processing circuit may further include a receiver and a transmitter.

The RF integrated circuit 305 may include the processor interface 325. The RF integrated circuit 305 may communicate with a processor (e.g., the processor 205) through the processor interface 325. The RF integrated circuit 305 may convert a received analog RF signal to a digital signal to transmit the digital signal to the processor through the processor interface 325, or may receive the digital signal from the processor and convert the digital signal to the analog RF signal. The processor may control the RF integrated circuit through the processor interface 325 of the RF integrated circuit 305.

As illustrated in FIG. 2, the first RF integrated circuit 210 and the second RF integrated circuit 220 may communicate with the processor 205 respectively through the processor interface 325 of the first RF integrated circuit 210 and the processor interface 325 of the second RF integrated circuit 220.

The RF integrated circuit 305 may include the control port 315. The control port 315 may be used to control an RF front end circuit (e.g., the first RF front end circuit 230 and the second RF front end circuit 235). The control port 315 may be an RF front end MIPI bus line or a GRFC port. A control port may be used as an RF front end MIPI bus line or a GRFC port without a configuration change. For example, the control port 315 may transmit a control signal of the RF front end MIPI bus line or a control signal of a GRFC as necessary.

A number of bus lines or a number of ports that may be provided in the RF integrated circuit 305 may be limited, and the number of bus lines or the number of ports provided by the RF integrated circuit 305 may not be sufficient to control all components of the RF front end circuit. According to an example embodiment, as described with reference to FIG. 2, the wireless communication device 200 including the RF integrated circuit may include the two RF integrated circuits 210 and 220 and control the RF front end circuit 230 using the control ports 215 and 225 of the respective RF integrated circuits. In an example embodiment, the entire available first control port 215 may be connected to components of the first RF front end circuit 230, and components that are not connected to the first control port 215 may be connected to the second control port 225.

According to one or more embodiments described herein, when the first RF integrated circuit 210 and the second RF integrated circuit 220 are activated for controlling the first RF front end circuit 230, not only the second control port 225 for controlling the first RF front end circuit 230 but also a circuit of the second RF integrated circuit 220 for processing the second RF signal is activated, and accordingly, unnecessary power consumption may occur.

To prevent unnecessary power consumption, the wireless communication device 200 may deactivate at least one component for processing the second RF signal in the second RF processing circuit (e.g., the RF processing circuit 310) when there is no need to process the second RF signal in the second RF integrated circuit 220 (e.g., the RF integrated circuit 305). For example, at least one of receivers included in the second RF processing circuit may be deactivated. However, this is merely an example, and multiple components, such as at least one transmitter, may be further included in the second RF processing circuit, and at least one component necessary for processing the second RF signal, such as a transmitter as well as a receiver, may be deactivated.

Since these elements have been described in detail with reference to FIG. 2, any repeated description has been omitted.

According to an example embodiment, the wireless communication device 200 including the RF integrated circuit (e.g., the RF integrated circuit 305 of FIG. 3) may include the processor 205, the first RF integrated circuit 210 including the first control port 215 for controlling a first RF processing circuit and the RF front end circuit 230 and communicating with the processor 205, the second RF integrated circuit 220 including the second control port 225 for controlling the second RF processing circuit and the RF front end circuit 230 and communicating with the processor 205, and the RF front end circuit 230 controlled through the first control port 215 and the second control port 225 and communicating with the first RF integrated circuit 210 to exchange the first RF signal, wherein the processor 205 may determine whether to process a second RF signal in a second RF processing circuit and may deactivate at least one component for processing the second RF signal in the second RF processing circuit.

A portion of the RF front end circuit 230 may be controlled by a control signal of the first control port 215, and another portion of the RF front end circuit 230 may be controlled by the control signal of the second control port 225.

The processor 205 may determine whether to activate the second RF integrated circuit 220 based on setting information of the first RF integrated circuit 210, the second RF integrated circuit 220, and the RF front end circuit 230 received through a network.

In response to it being determined that the second RF integrated circuit 220 is to be deactivated, the processor 205 may deactivate the second RF integrated circuit 220 and activate only the first RF processing circuit and the first control port 215.

In response to it being determined that the second RF integrated circuit 220 is to be activated, the processor 205 may determine whether to process the second RF signal in the second RF processing circuit based on setting information.

In response to it being determined that the second RF signal is to be processed by the second RF processing circuit, the processor 205 may activate the first RF processing circuit, the first control port 215, the second RF processing circuit, and the second control port 225.

The setting information may include communication frequency band, CA, or EN-DC combination information.

The processor 205 may decide to activate the second RF integrated circuit 220 in response to identifying that the number of frequency bands used for the wireless communication in the communication frequency band, CA, or EN-DC combination information from the setting information exceeds the threshold value.

Figure 4:
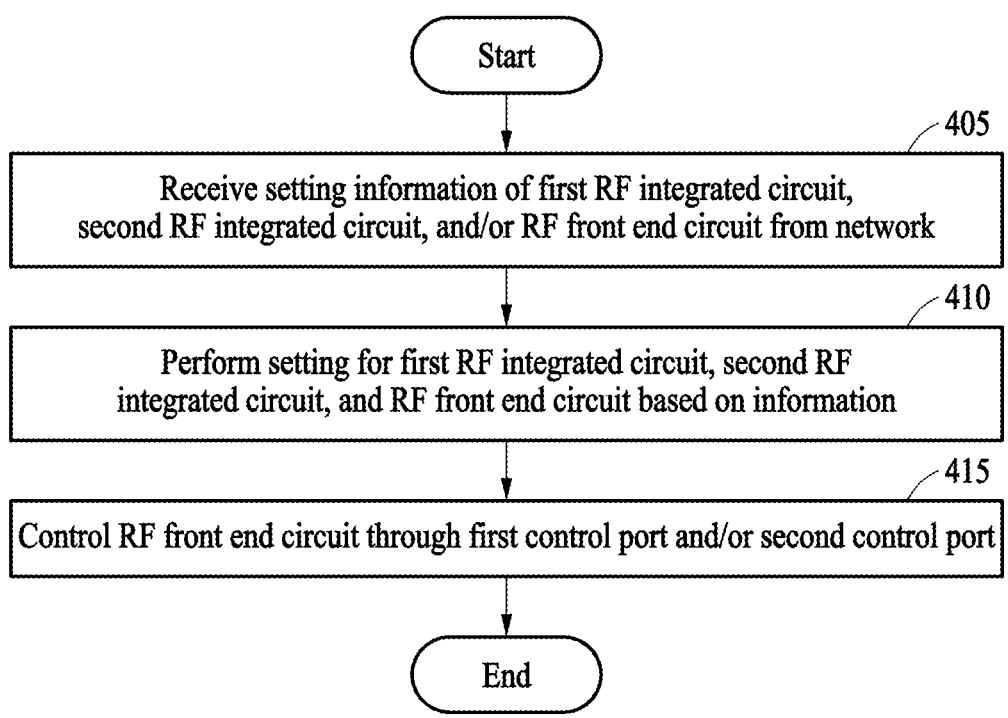
FIG. 4 is a flowchart illustrating a method of controlling a wireless communication device including an RF integrated circuit according to an example embodiment.

FIG. 4 is a flowchart illustrating a method of controlling a wireless communication device including an RF integrated circuit according to an example embodiment.

Referring to FIG. 4, in operation 405, the wireless communication device (e.g., the wireless communication device 200) may receive setting information of a first RF integrated circuit (e.g., the first RF integrated circuit 210), a second RF integrated circuit (e.g., the second RF integrated circuit 220), and/or a first RF front end circuit (e.g., the first RF front end circuit 230) from a network. The setting information may further include setting information on a second RF front end circuit (e.g., the second RF front end circuit 235).

The setting information may be RRC configuration information. The setting information may include communication frequency band, CA, or EN-DC combination information.

In operation 410, the wireless communication device may set the first RF integrated circuit, the second RF integrated circuit, and/or the first RF front end circuit based on the setting information. When setting based on the setting information, the wireless communication device may determine whether to process a RF signal in the second RF integrated circuit and may deactivate at least one component for processing a second RF signal in a second RF processing circuit based on the determining to prevent unnecessary power consumption. This process will be described with reference to FIG. 5.

In operation 415, the wireless communication device may control the first RF front end circuit set through a first control port (e.g., the first control port 215) and a second control port (e.g., the second control port 225) using the set first RF integrated circuit and the set second RF integrated circuit. The wireless communication device may control the first RF front end circuit to generate an RF signal path and perform wireless communication through an antenna (e.g., one or more of the antenna 282, 284, 286, and 288).

Figure 5:
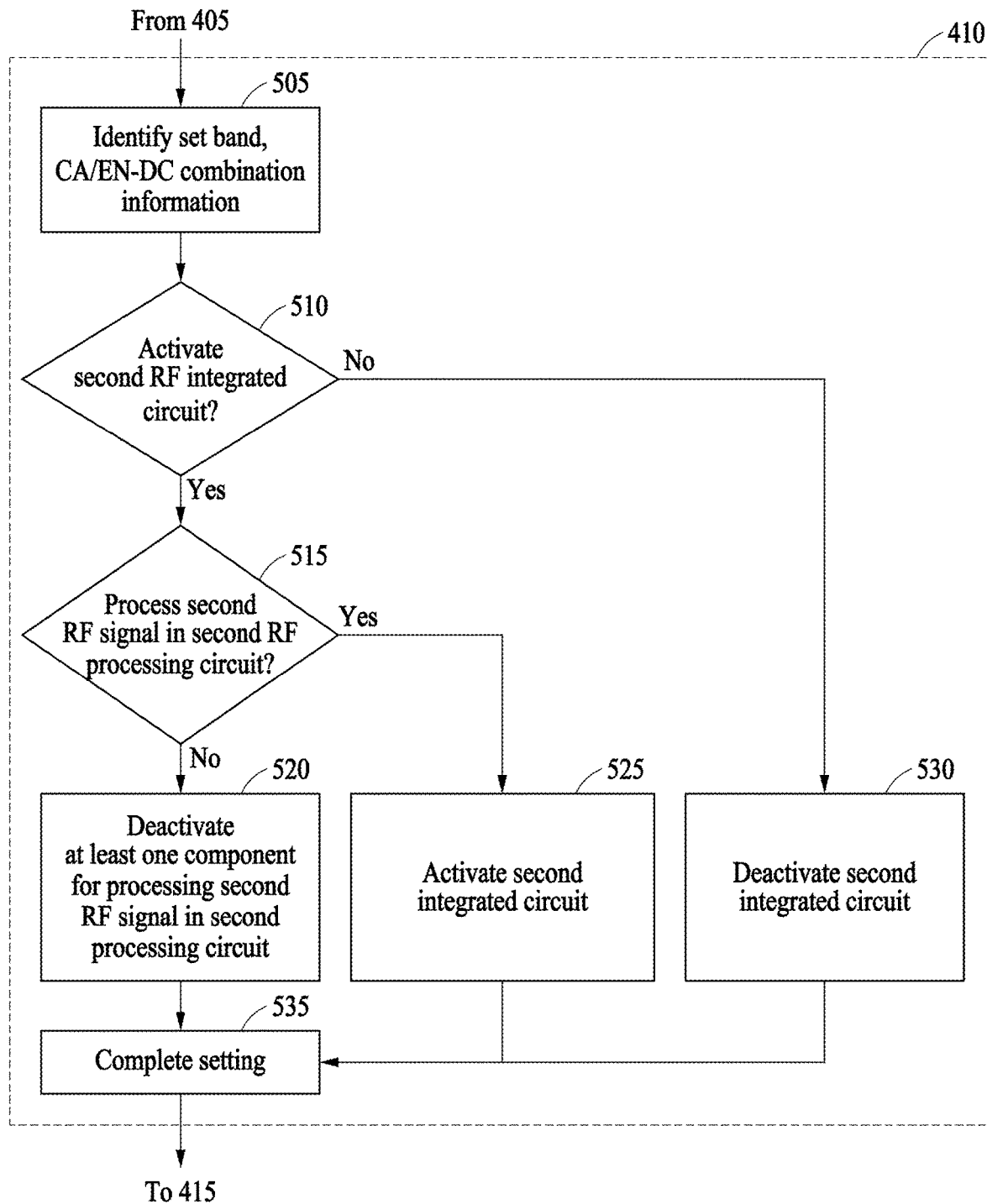
FIG. 5 is a flowchart illustrating a method of setting a first RF integrated circuit and a second RF integrated circuit of a wireless communication device including an RF integrated circuit according to an example embodiment.

FIG. 5 is a flowchart illustrating a method of setting a first RF integrated circuit and a second RF integrated circuit of a wireless communication device including an RF integrated circuit according to an example embodiment.

In embodiments, in response to the wireless communication device (e.g., the wireless communication device 200) receiving setting information of a first RF integrated circuit (e.g., the first RF integrated circuit 210), a second RF integrated circuit (e.g., the second RF integrated circuit 220), and/or a first RF front end circuit (e.g., the first RF front end circuit 230) from a network in operation 405, the wireless communication device may identify communication frequency band, CA, and/or EN-DC combination information from the setting information in operation 505.

In operation 510, the wireless communication device may determine whether to activate the second RF integrated circuit based on the identified information. The wireless communication device may decide to activate the second RF integrated circuit when multiple frequency bands exceeding a threshold value are used for wireless communication. Since this process has been described in detail with reference to FIG. 2, any repeated description has been omitted.

In response to it being determined that the second RF integrated circuit is to be deactivated, the wireless communication device may deactivate the second RF integrated circuit and activate the first integrated circuit in operation 530 according to one or more embodiments described herein. When a first RF front end circuit does not need to be controlled by the second RF integrated circuit, unnecessary power consumption may be prevented by deactivating the second RF integrated circuit.

In response to it being determined that the second RF integrated circuit is to be activated, the wireless communication device may determine whether to process a second RF signal in a second RF processing circuit based on the setting information. The wireless communication device may determine whether a second RF signal path should be set in the second RF integrated circuit for transmitting and receiving the second RF signal through an antenna (e.g., one or more of the antenna 290 and 292) based on RRC information according to one or more embodiments described herein. In response to it being determined that the second RF signal path is to be set, the wireless communication device may decide to process the second RF signal in the second RF processing circuit.

In response to it being determined that the second RF signal is to be processed by the second RF processing circuit, the wireless communication device may activate the first integrated circuit and the second integrated circuit in operation 525. In this case, a first RF signal path may be formed through the first RF integrated circuit and the first RF front end circuit, and the second RF signal path may be formed through the second RF integrated circuit and a second RF front end circuit. The first RF front end circuit may be controlled by the first integrated circuit and the second integrated circuit through a first control port (e.g., the first control port 215) and a second control port (e.g., the second control port 225). The second RF front end circuit 235 may be controlled by the second integrated circuit through the second control port 225.

In response to it being determined that the second RF signal is not to be processed by the second RF processing circuit, in operation 520, the wireless communication device may deactivate at least one component for processing the second RF signal in the second RF processing circuit. For example, it response to it being determined that the second RF signal is not to be processed by the second RF processing circuit, the wireless communication device may deactivate a PRx and a DRx in the second RF processing circuit.

The wireless communication device may complete a setting for an activated component in operation 535 and proceed to perform operation 415 to control the RF front end circuit through the first control port and the second control port and perform wireless communication.

Figure 6:
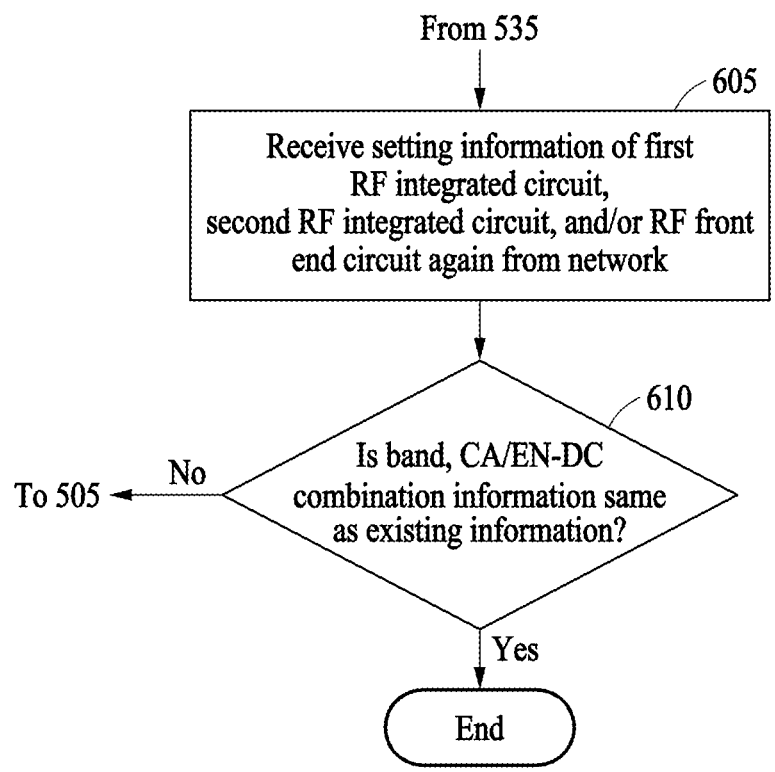
FIG. 6 is a flowchart illustrating an additional setting operation of a wireless communication device including an RF integrated circuit according to an example embodiment.

FIG. 6 is a flowchart illustrating an additional setting operation of a wireless communication device including an RF integrated circuit according to an example embodiment.

In operation 605, the wireless communication device (e.g., the wireless communication device 200) may receive setting information of a first RF integrated circuit (e.g., the first RF integrated circuit 210), a second RF integrated circuit (e.g., the second RF integrated circuit 220), and/or a first RF front end circuit (e.g., the first RF front end circuit 230) again from a network. The setting information may further include setting information on a second RF front end circuit (e.g., the second RF front end circuit 235).

In response to the setting information (e.g., RRC configuration information) being received again, the wireless communication device may determine whether CA or EN-DC combination information is the same as existing information in operation 610. When the information received again is the same as the existing information, the wireless communication device may maintain a current state.

In response to the information received again being different from the existing information, the wireless communication device may perform operations 505 to 535 again to determine whether to activate the second RF integrated circuit and process a second RF signal in a second RF processing circuit and may set the first RF integrated circuit, the second RF integrated circuit, the first RF front end circuit, and a second RF front end circuit according to the determining.

According to an example embodiment, a method of controlling the wireless communication device 200 including an RF integrated circuit may include receiving setting information of the first RF integrated circuit 210 including a first RF processing circuit and the first control port 215, a second RF integrated circuit 220 including a second RF processing circuit and the second control port 225, and the RF front end circuit 230 exchanging a first RF signal with the first RF integrated circuit 210 from a network, setting the first RF integrated circuit 210, the second RF integrated circuit 220, and the RF front end circuit 230 based on the setting information, and controlling the RF front end circuit 230 through the first control port 215 and the second control port 225, wherein the setting may include determining whether to process a second RF signal in the second RF processing circuit based on the setting information and deactivating at least one component for processing the second RF signal in the second RF processing circuit based on the determining.

The setting may include determining whether to activate the second RF integrated circuit 220 based on the setting information.

When it is determined that the second RF integrated circuit 220 is to be deactivated, the setting may include deactivating the second RF integrated circuit 220 and activating the first RF processing circuit and the first control port 215.

The determining of whether to process the second RF signal may be performed in response to a determination that the second RF integrated circuit 220 is to be activated.

In response to it being determined that the second RF processing circuit is to be activated, the setting may include activating the first RF processing circuit, the first control port 215, the second processing circuit, and/or the second control port 225.

A portion of the RF front end circuit 230 may be controlled through the first control port 215, and another portion of the RF front end circuit 230 may be controlled through the second control port 225.

The setting information may include the communication frequency band, CA, or EN-DC combination information.

The determining of whether to activate the second RF integrated circuit 220 may include identifying the communication frequency band, CA, or EN-DC combination information, and deciding to activate the second RF integrated circuit 220 when a number of frequency bands used for wireless communication in the identified information exceeds a threshold value.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that various example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, and/or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A wireless communication device comprising:
    a processor;
    a first radio frequency (RF) integrated circuit comprising a first control port for controlling a first RF processing circuit and an RF front end circuit and configured to communicate with the processor;
    a second RF integrated circuit comprising a second control port for controlling a second RF processing circuit and the RF front end circuit and configured to communicate with the processor; and
    the RF front end circuit controlled through the first control port and the second control port and configured to communicate with the first RF integrated circuit to exchange a first RF signal,
    wherein the processor is configured to:
    determine whether to activate the second RF integrated circuit based on a number of frequency bands used for a wireless communication and a threshold value, wherein it is determined that the second RF integrated circuit is to be activated responsive to the number of frequency bands used for the wireless communication exceeding the threshold value;
    in response to a determination that the second RF integrated circuit is to be activated, determine whether to process a second RF signal in the second RF processing circuit; and
    in response to a determination that the second RF signal is not to be processed by the second RF processing circuit, deactivate one or more receivers comprised in the second RF processing circuit.

2. The wireless communication device of claim 1, wherein a portion of the RF front end circuit is controlled by a first control signal of the first control port, and another portion of the RF front end circuit is controlled by a second control signal of the second control port.

3. The wireless communication device of claim 1, wherein the processor is configured to determine whether to activate the second RF integrated circuit based on setting information of the first RF integrated circuit, the second RF integrated circuit, and the RF front end circuit received through a network.

4. The wireless communication device of claim 3, wherein the processor is configured to, in response to a determination that the second RF integrated circuit is to be deactivated, deactivate the second RF integrated circuit and activate only the first RF processing circuit and the first control port.

5. The wireless communication device of claim 3, wherein the processor is configured to, in response to a determination that the second RF integrated circuit is to be activated, determine whether to process the second RF signal in the second RF processing circuit based on the setting information.

6. The wireless communication device of claim 5, wherein the processor is configured to, in response to a determination that the second RF signal is to be processed by the second RF processing circuit, activate the first RF processing circuit, the first control port, the second RF processing circuit, and the second control port.

7. The wireless communication device of claim 3, wherein the setting information comprises communication frequency band, carrier aggregation (CA) or E-UTRA new radio (NR) dual connectivity (EN-DC) combination information.

8. The wireless communication device of claim 7, wherein the processor is configured to identify the communication frequency band, CA or EN-DC combination information from the setting information and determine to activate the second RF integrated circuit when a number of frequency bands used for wireless communication exceeds a threshold value in the identified information.

9. A method of controlling a wireless communication device, the method comprising:
    receiving setting information of at least one of a first radio frequency (RF) integrated circuit comprising a first RF processing circuit and a first control port, a second RF integrated circuit comprising a second RF processing circuit and a second control port, or an RF front end circuit exchanging a first RF signal with the first RF integrated circuit from a network;
    setting the first RF integrated circuit, the second RF integrated circuit, and the RF front end circuit based on the setting information; and
    controlling the RF front end circuit through the first control port and the second control port,
    wherein the setting of the first RF integrated circuit, the second RF integrated circuit, and the RF front end circuit comprises:
    determining whether to activate the second RF integrated circuit based on a number of frequency bands used for a wireless communication and a threshold value, wherein it is determined that the second RF integrated circuit is to be activated responsive to the number of frequency bands used for the wireless communication exceeding the threshold value;
    in response to a determination that the second RF integrated circuit is to be activated, determining whether to process a second RF signal in the second RF processing circuit; and
    in response to a determination that the second RF signal is not to be processed by the second RF processing circuit, deactivating one or more receivers comprised in the second RF processing circuit.

10. The method of claim 9, wherein the setting of the first RF integrated circuit, the second RF integrated circuit, and the RF front end circuit comprises determining whether to activate the second RF integrated circuit based on the setting information.

11. The method of claim 10, wherein the setting of the first RF integrated circuit, the second RF integrated circuit, and the RF front end circuit comprises, in response to a determination that the second RF integrated circuit is to be deactivated, deactivating the second RF integrated circuit and activating the first RF processing circuit and the first control port.

12. The method of claim 10, wherein the determining of whether to process the second RF signal is performed as part of the determining of whether to activate the second RF integrated circuit in response to a determination that the second RF integrated circuit is to be activated.

13. The method of claim 12, wherein the setting of the first RF integrated circuit, the second RF integrated circuit, and the RF front end circuit comprises, in response to a determination that the second RF processing circuit is to be activated, activating the first RF processing circuit, the first control port, the second RF processing circuit, and the second control port.

14. The method of claim 10, wherein the setting information comprises communication frequency band, carrier aggregation (CA) or E-UTRA new radio (NR) dual connectivity (EN-DC) combination information.

15. The method of claim 14, wherein the determining of whether to activate the second RF integrated circuit comprises:
identifying the communication frequency band, CA or EN-DC combination information from the setting information; and
deciding to activate the second RF integrated circuit when a number of frequency bands used for wireless communication in the identified information exceeds a threshold value.

16. The method of claim 9, wherein a portion of the RF front end circuit is controlled through the first control port, and another portion of the RF front end circuit is controlled through the second control port.

17. A radio frequency (RF) integrated circuit comprising:
an RF processing circuit to process an RF signal, the RF processing circuit comprising:
a primary receiver to receive the RF signal from an RF front end circuit through a primary reception path,
a diversity receiver to receive the RF signal from the RF front end circuit through a diversity reception path,
a first transmission chain to transmit the RF signal to the RF front end circuit,
a second transmission chain to transmit the RF signal to the RF front end circuit, and
a core processor to control the primary receiver, the diversity receiver, the first transmission chain, and the second transmission chain;
a control port to control the RF front end circuit; and
a processor interface to communicate with a processor, wherein the processor is configured to:
determine whether to activate the RF integrated circuit based on a number of frequency bands used for a wireless communication and a threshold value, wherein it is determined that the second RF integrated circuit is to be activated responsive to the number of frequency bands used for the wireless communication exceeding the threshold value;
in response to a determination that the RF integrated circuit is to be activated, determine whether to process the RF signal in the RF processing circuit; and
in response to a determination that the RF signal is not to be processed by the RF processing circuit, deactivate at least one of the primary receiver and the diversity receiver.

18. The RF integrated circuit of claim 17, wherein the control port is one of an RF front end mobile industry processor interface (MIPI) bus line or a general RF control (GRFC) port.

19. The RF integrated circuit of claim 18, wherein the control port transmits at least one of a first control signal of the RF front end MIPI bus line or a second control signal of a GRFC.

* * * * *